July 3, 1956      J. C. TRAVILLA      2,752,863
RAILWAY TRUCK
Filed June 7, 1951
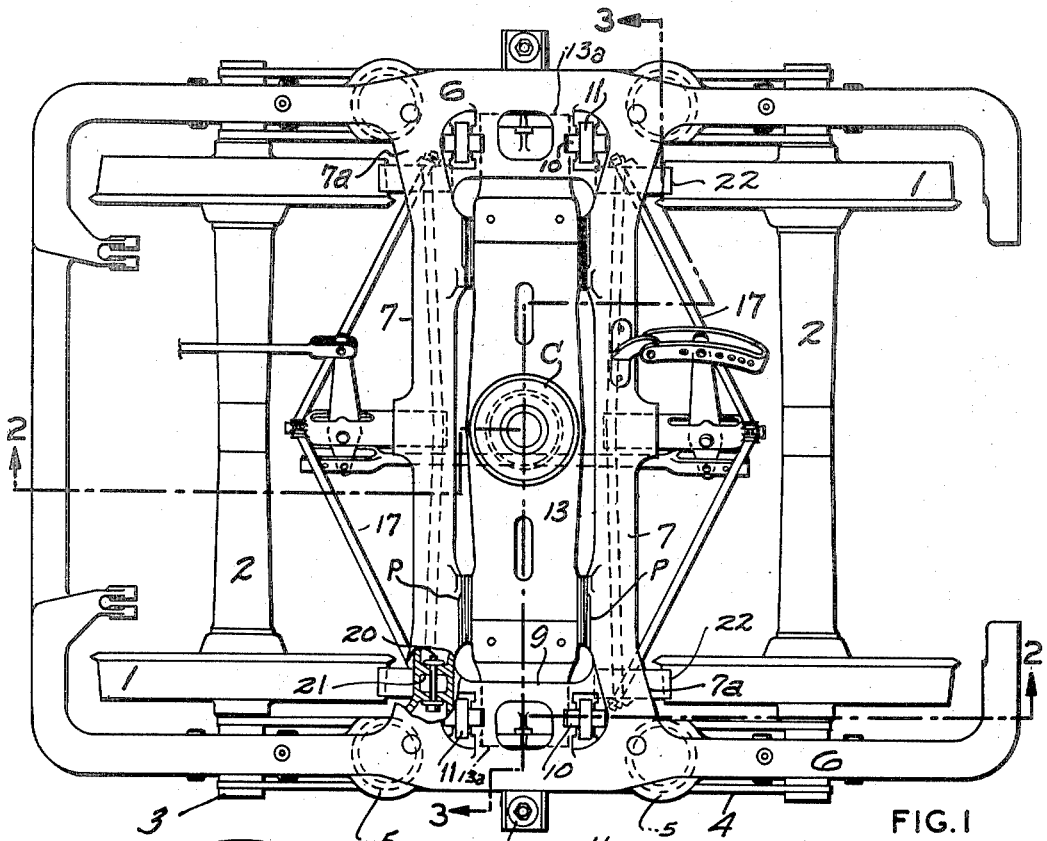
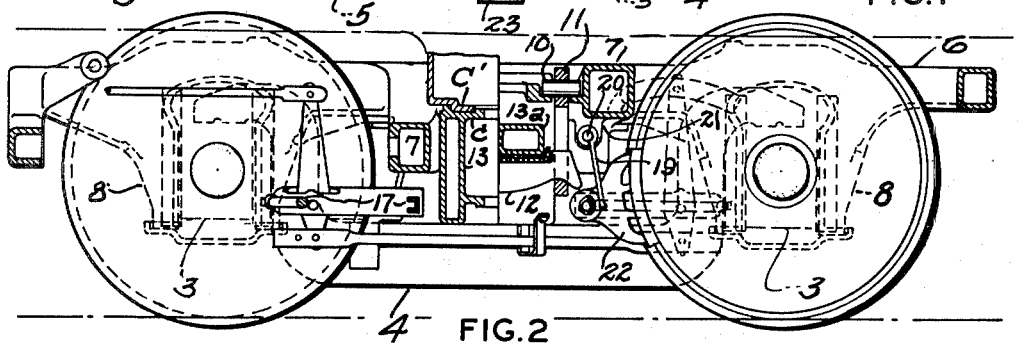
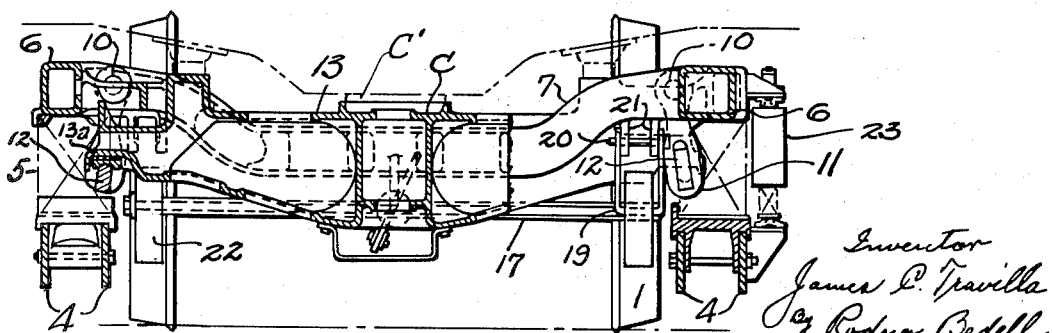

United States Patent Office 2,752,863
Patented July 3, 1956

2,752,863

RAILWAY TRUCK

James C. Travilla, University City, Mo., assignor to General Steel Castings Corporation, Granite City, Ill., a corporation of Delaware Application June 7, 1951, Serial No. 230,312

12 Claims. (Cl. 105—190)

The invention relates to railway rolling stock and more particularly to railway trucks having lateral motion bolsters supported from the truck frame by swing hangers. This application is a continuation-in-part of an application filed April 10, 1950, Serial No. 154,953, now abandoned.

The invention has been developed in connection with a four-wheel truck for use in high-speed freight service which includes equalizers between the wheel and axle assemblies upon which the truck frame is spring-supported. It is desired to support the bolster by swing hangers arranged to have the swing hangers at opposite sides of the truck spaced transversely of the truck as far or farther apart than the wheels, rather than being in line line with the wheels, to permit shortening of the truck wheel base. An equalized truck with swing hangers spaced apart a greater distance transversely of the truck than wheel treads will permit assembly of the brake parts, such as the brake heads and brake beams between adjacent wheel treads in a truck having a shorter wheel base than in a truck with swing hangers spaced apart transversely of the truck the usual distance, that is, a distance which is the same or less than the transverse spacing of the wheel treads, and one object of the present invention is to adapt the bolster and swing hangers of a truck of the kind described for association with the equalizers and brake parts without interference.

Another object of the invention is to avoid the tilting of the truck frame and bolster longitudinally of the vehicle relative to each other and to the vehicle underframe due to action of the brakes and the equalizer springs.

The shorter the distance between the swing hangers at each end of the bolster, the shorter the length of the cross bar between them and the shorter the bearing of the bolster on the cross bar. When the bearing is as short as shown in the earlier filed application, there may be a tendency for the truck frame to tilt longitudinally of the truck when the brakes are applied due to the upward thrust through one brake beam from the associated wheels on one axle and the downward thrust through the other brake beam from the wheels on the other axle. This tilting of the frame results in the pivoting of the bolster upon the swing hanger cross bar about one lower edge of the bolster due to the fact that the weight of the vehicle body and the diameter of the body and truck center plate holds the truck bolster parallel to the body. Under such conditions a spacer block may be placed between the end of each truck frame and the vehicle underframe to stabilize the truck frame against such tilting but such an arrangement involves maintenance and is otherwise undesirable.

To provide stability against truck frame inclination in a longitudinal vertical plane under braking action, the bearing of the bolster on the bottom swing hanger cross bar should be of a length which will provide the desired resistance to the tilting of the frame as a result of the braking forces. If the length of the bearing of the bolster on the swing hanger cross bar exceeds the diameter of the center plate, then any tilting action of the truck frame that may occur due to braking action would also provide tilting action between the truck center plate and the body center plate. Tilting action between the truck and body center plates would be undesirable since wear between the two plates would then be much greater during relative swiveling action between the plates than when swiveling action occurs without relative tilting of the two plates. When the two plates are inclined to each other there is a point contact between them and wear is much greater for a point contact than for a full bearing contact. If the diameter of the center plate is greater than the length of bearing of the bolster on the swing hanger cross bar, then any tilting action of the truck frame due to braking action would occur between the bolster bearing and the swing hanger cross bar and there would then be a point contact between the bolster bearing and the cross bar and there would be no sliding action between these parts as the truck swivels. To obtain the maximum stability with a given size center plate and a minimum amount of wear of the truck center plate and body center plate, there is a critical ratio of center plate diameter and bolster bearing length which would be a bolster bearing length of approximately 95% of the diameter of the center plate.

In the accompanying drawings, which illustrate a selected embodiment of the invention:

Figure 1 is a top view of a four-wheel truck.

Figure 2 is a longitudinal section taken on the line 2—2 of Figure 1.

Figure 3 is a vertical transverse section taken on the line 3—3 of Figure 1.

The truck includes the usual wheels 1, axles 2, journal boxes 3, double equalizer bars 4, equalizer springs 5 which mount a truck frame including side members or wheel pieces 6 and spaced transverse transoms 7, there being pedestals 8 depending from the wheel pieces alongside of the journal boxes 3. The portions of the wheel pieces at the middle of the truck are offset outwardly of the truck beyond the portions of the wheel pieces over journal boxes 3.

Brackets 9 extend between the end portions of transoms 7 and the offset portions of the wheel pieces and are provided with bearings for seating pivot pins 10 by which bolster swing hangers 11 are suspended from the frame. Hangers 11 are positioned between transoms 7. Pins 10 are positioned substantially above the inner equalizer bars 4 and preferably above the level of the bottom of wheel pieces 6, and hangers 11 are short enough that they may swing over the inner equalizer bars. Cross bars 12 are carried by the lower ends of hangers 11 at each side of the truck and a bolster 13 extends from side to side of the truck and is carried upon the swing hanger cross bars 12.

The middle of the bolster mounts a bolster center plate C, the diameter of which corresponds to the width of the bolster and to the distance between the transoms. The bolster end portions 13a are somewhat narrower than the remainder of the bolster and the width of their lower faces bearing upon the hanger cross bars 12 are slightly less than the diameter of the interengaging surfaces of the truck center plate C and the associated body center plate C'. If the ratio between the length of the bolster cross bar bearing is approximately 95% of the diameter of the interengaging surfaces of the center plates, the bolster will be stably mounted upon the cross bars and will not tilt longitudinally of the truck under the rotatable forces set up by the application of the brakes, it being understood that the interengaging surfaces of the truck and body center plates, under the weight of the body, will prevent tilting of the center plates on each other longitudinally of the truck.

Brake beams 17 of American Association of Railroads truss type are suspended by brake hangers 19 from pins 20 seated in brackets 21 which project downwardly and outwardly from transoms 7 at the sides of the latter opposite to brackets 9 which seat the bolster swing hangers. Brake hangers 19 and brake heads 22 are in line with the wheels longitudinally of the truck and are spaced just inwardly of the truck from inner equalizer bars 4. Bolster swing hangers 11, and particularly their lower portions, are positioned outwardly of the general longitudinal plane of the brake hangers and bolster hanger cross bars 12 may be withdrawn from hangers 11 without difficulty.

By narrowing the ends of the bolster as at 13a, offsetting the adjacent portions of the wheel pieces outwardly and placing the bolster swing hangers 11 between transoms 7 (instead of in the usual position in alignment with the transoms transversely of the truck), bolster hangers 11 may be spaced farther apart transversely of the truck than brake hangers 19 and better clear the adjacent brake parts. This provides for a wheel base which is shorter than could be provided in a truck with the usual bolster and bolster swing hanger arrangement. By shortening bolster swing hangers 11, as best shown in Figure 3, so that they swing transversely of the truck above equalizers 4, the maximum lateral spacing of bolster swing hangers 11 is provided without interference with the equalizers.

To best accommodate the above described arrangement of the bolster swing hangers and the brake hangers, the transom end portions 7a are inclined from their chafing plate mounting pads P towards the sides and ends of the truck, thus accommodating the positioning of the bolster swing hanger substantially in alignment with the chafing plates transversely of the truck and also terminating the transoms immediately adjacent the upper seats on the frame for equalizer springs 5.

To provide the simplest means to control the vertical action of the equalizer springs, a snubber 23 is provided between the equalizer and the truck frame at the transverse center line of the truck. The flat support of the bolster on the swing hanger cross bars maintains the frame in horizontal position and therefore prevents truck frame gallop. A support that does not provide stability when using springs of desired characteristics would require that the snubber be located at points spaced from the transverse center line or some other method would have to be used to stabilize the frame. The combination of snubbing devices in this location and a bolster having a bearing on the swing hanger cross bar slightly less in length than the diameter of the center plate, provides greater simplicity of the truck, less wear of the snubbing device, and a spring support for the truck frame on the equalizers with the resiliency required to provide good riding conditions. The combination also provides maximum stability against tilting action of the truck frame due to brake action and minimum wear of the truck parts as well as minimum wear between the truck and body center plates.

The association of the parts described above provides for lateral movement of the bolsters, sufficient to improve the riding qualities of the truck in a short wheel base truck, as is desirable for high-speed freight service, and attains the objectives set forth in the introductory portion of the specification.

The details of the parts may be varied substantially without affecting the novel features described and the exclusive use of those modifications coming within the scope of the claims is contemplated.

What is claimed is:

1. In a railway truck, wheel and axle assemblies, equalizers extending longitudinally of the truck and each supported at its opposite ends from said assemblies, springs mounted upon said equalizers, a truck frame including side members outwardly of the wheels mounted on said springs, hangers at each side of the truck pivotally suspended from said frame inwardly of said side members with their lower ends disposed to swing outwardly transversely of the truck and over said equalizers whereby clearance is maintained between the hangers and equalizers, and a bolster supported from said hangers.

2. In a railway truck as described in claim 1, brake hangers pivotally suspended from the truck frame inwardly of the truck from the bolster hangers and swinging longitudinally of the truck, and brake beams terminating inwardly of the truck from said bolster hangers and carried by the lower ends of said brake hangers and movable towards and from the wheel treads.

3. In a railway truck, wheels and axles, equalizers extending longitudinally of the truck outwardly of said wheels and each supported at its opposite ends from said axles, springs mounted upon said equalizers, a truck frame including side members positioned outwardly of the wheels and mounted on said springs, hangers suspended from said frame inwardly of the truck from said side members and outwardly of the truck from said wheels and swinging transversely of the truck over said equalizers, and a load-carrying bolster extending transversely of the truck and supported by said hangers and above their lower ends whereby the hangers and bolster clear the equalizers during the lateral motion of the bolster relative to the truck frame.

4. In a railway truck, wheel and axle assemblies, equalizers extending longitudinally of the truck and each supported at its ends from said assemblies and each including a drop portion between its ends having an upper face below the level of the axles, springs mounted upon said equalizer faces, a truck frame including side members positioned outwardly of the truck from the wheels and mounted on said springs, hangers suspended from the frame inwardly of said side members to swing transversely of the truck with their lower ends above said equalizer faces, a load-carrying bolster supported by said hangers, said hangers being positioned outwardly of the general plane of the wheel treads whereby said hangers clear brake heads movable towards and from the wheel treads as the brakes are applied and released.

5. In a railway truck, wheel and axle assemblies, double bar equalizers extending longitudinally of the truck and each supported at its ends from said assemblies, springs mounted upon said equalizers, a truck frame including wheel pieces mounted on said springs and offset outwardly of the truck at the middle of the truck, laterally swinging hangers with their upper ends positioned adjacent to the offset portion of the corresponding wheel piece and pivotally suspended from said frame at points on the latter substantially aligned vertically with the inner equalizer bars and inclined downwardly and outwardly of the truck from their pivots, the lower ends of said hangers terminating above the inner equalizer bars, a bolster supported from said swing hangers, brackets on said truck frame positioned inwardly of the truck from said bolster hangers and adapted to support brake heads applicable to the wheel treads with clearance between such brake heads and the bolster hangers.

6. In a railway truck, spaced wheel and axle assemblies, a truck frame including wheel pieces of box-like cross section, positioned outwardly of the wheels and offset outwardly of the truck at the middle of the truck, and spaced transverse transoms between said wheel pieces, brake hangers suspended from said frame, brackets extending between said transoms and inwardly of the offset portions of said wheel pieces, hangers pivotally suspended from said brackets, with their upper ends positioned in the recesses formed by the offset portions of the wheel pieces, to swing transversely of the truck and spaced apart transversely of the truck a greater distance than said brake hangers, and a load-carrying bolster carried by said second-mentioned hangers.

7. In a railway truck, spaced wheel and axle assemblies, equalizers extending between said assemblies, springs thereon, a truck frame carried on said springs and including wheel pieces and spaced transverse transoms extending between said wheel pieces, a bracket between said transoms at each side of the truck inwardly of the corresponding wheel piece, a pair of swing hangers at each side of the truck with their upper ends spaced inwardly from said wheel pieces and positioned between said transoms and pivoted to the corresponding bracket above the level of the bottom of the wheel piece to swing transversely of the truck, a load-carrying bolster between said transoms, hangers pivoted to said frame at their upper ends and having brake elements at their lower ends for engagement with the treads of the wheels of said assemblies, the middle of said bolster extending substantially from transom to transom and mounting a load-carrying center plate and the ends of said bolster being narrowed to pass between said swing hangers, and cross bars carried by said swing hangers and supporting said bolster ends and being insertible and removable lengthwise of the truck between said springs and brake hangers.

8. A truck as described in claim 3 which includes a friction snubber at each side of the truck connected to a truck side member and to the associated equalizer intermediate the frame supporting springs on the equalizer.

9. A truck as described in claim 1 which includes a friction snubber comprising upright telescoping members pivotally connected respectively to a frame side member and to the associated equalizer intermediate the frame supporting springs on the equalizer.

10. In a railway truck, wheel and axle assemblies, equalizers extending longitudinally of the truck and each supported at its ends from said assemblies, springs mounted upon each of said equalizers and spaced apart longitudinally of the truck, a truck frame including side members mounted on said springs, hangers at each side of the truck spaced apart longitudinally of the truck and pivotally suspended from the truck frame inwardly of the side member and outwardly of the wheel treads with their lower ends disposed to swing transversely of the truck above the associated equalizer, a cross bar carried on the lower ends of said hangers, and a bolster extending transversely of the truck with its ends forming bearings elongated longitudinally of the truck and resting directly upon the cross bars, there being a load supporting center plate at the middle of the bolster having a body center plate-engaging surface with a diameter slightly exceeding the length of the bolster bearings on the cross bars.

11. In a railway truck, wheel and axle assemblies, equalizers extending longitudinally of the truck and supported from said assemblies, springs mounted upon each of said equalizers and spaced apart longitudinally of the truck, a truck frame including side members mounted on said springs and transverse transoms spaced apart longitudinally of the truck, the adjacent ends of the transoms diverging from each other and merging with the frame side members, there being a bracket integral with and extending inboard from each frame side member and between the adjacent diverging ends of the transoms, hangers pivotally suspended from each bracket adjacent the ends of the transoms, a crossbar carried on the lower ends of adjacent hangers, and a bolster extending transversely of the truck and carried on said cross bars between the hangers, a flat load-supporting center plate on the intermediate portion of the bolster having a diameter approximating the distance between the transoms, the ends of the bolster having bearings on the cross bars extending longitudinally of the truck a distance slightly less than the diameter of the center plate.

12. Structure as described in claim 10 which includes a friction snubbing device at each side of the truck connected to the frame side member and associated equalizer on the transverse center line of the truck.

References Cited in the file of this patent

UNITED STATES PATENTS

| | | |
|---|---|---|
| 564,363 | Cliff | July 21, 1896 |
| 1,274,348 | Taylor | July 30, 1918 |
| 2,051,650 | Oelkers | Aug. 18, 1936 |
| 2,253,042 | Muchnic | Aug. 19, 1941 |
| 2,573,232 | Travilla et al. | Oct. 30, 1951 |
| 2,574,804 | Van Der Sluys | Nov. 13, 1951 |
| 2,578,554 | Janeway | Dec. 11, 1951 |
| 2,713,832 | Dean et al. | July 26, 1955 |